United States Patent [19]

Hervey et al.

[11] 3,872,044

[45] Mar. 18, 1975

[54] THERMOPLASTIC SCREEN PROCESS INKS

[75] Inventors: John D. Hervey, Cleveland Heights; Waymon G. Smith, Cleveland, both of Ohio

[73] Assignee: Ferro Corporation, Cleveland, Ohio

[22] Filed: Sept. 25, 1972

[21] Appl. No.: 291,710

[52] U.S. Cl...... 260/30.8 R, 117/132 C, 117/161 P, 260/32.6 NA, 260/37 N
[51] Int. Cl...... B44d 1/09, c08g 41/02, C08g 51/48
[58] Field of Search............ 260/33 A, 33 R, 308 R, 260/37 N, 32.6 NA, DIG. 38; 106/308 Q

[56] References Cited
UNITED STATES PATENTS

| | | | |
|---|---|---|---|
| 2,824,848 | 8/1958 | Witcoff | 260/29.2 |
| 2,861,002 | 11/1958 | Britton | 106/177 |
| 3,132,961 | 4/1964 | Pierpoint | 106/308 |
| 3,224,893 | 12/1965 | Floyd | 106/316 |
| 3,290,165 | 12/1966 | Iannecelli | 106/308 |
| 3,639,313 | 1/1972 | Gruben | 260/18 N |
| 3,652,469 | 4/1972 | Glazer | 260/18 N |

*Primary Examiner*—Allan Lieberman
*Attorney, Agent, or Firm*—Milton L. Simmons; Wesley B. Taylor

[57] ABSTRACT

A thermo-fluid, fast-set ink is disclosed for application to ceramic, metal or plastic ware such as bottles. The ink comprises a solid thermoplastic polyamide resin, formed by interreacting a dicarboxylic acid and a linear diamine, and preferably includes as well a compatible plasticizer for the resin. The resin has a molecular weight and/or is so plasticized as to have a melting point within the range of about 85°C to about 120°C. A sufficient amount of a pigment is present to impart color to the ink. When the ink is to be used on ceramic ware, such as glass containers, the ink preferably includes a substituted organosilane having at least one alkoxy or aryloxy group and at least one organic group compatible with the polyamide resin. The silane serves to bond the resin of the ink chemically to a vitreous surface. The ink is also adapted for a multi-color screening process without leaving screen or pick-off marks. In this embodiment, a succeeding screening application of the polyamide resin involves a different color pigment and is from an alcoholic solution, the alcohol having a boiling point within the range of about 110°C to about 175°C.

10 Claims, No Drawings

THERMOPLASTIC SCREEN PROCESS INKS

BACKGROUND OF THE INVENTION

The decoration of ceramic surfaces by the so-called silk screen process is well established. In particular, a screen of fine stainless steel wires is used in which selected areas of the screen are blocked or masked so as to pass through the screen a decorating ink or paint in a predetermined pattern only, the pattern defining the print to be deposited on the ceramic. This practice has encountered a number of problems arising in particular with the demands of ever increasing speed in screen application, multi-color screen printing, and economic considerations in screen-printing disposable or throwaway containers.

For many years screen printing of ceramics, such as porcelain enamel, has been carried out by dispersing a pigment and ground vitreous frit in a liquid vehicle, such as a viscous oil, squeegeeing the dispersion through a masked screen onto the ceramic surface, and then firing the ceramic to drive off the organic constituents of the dispersion and fix the pigment to the ceramic surface. When the speed requirements of screen printing are not great and/or highly durable, fired prints are desired, this process is quite satisfactory. Its advantages begin to pale when multi-color, superimposed or ajoining prints are desired. In this case, each screening operation must be followed by airdrying and hardening steps, often involving oven equipment, before a succeeding screen application can be made on the same ceramic ware, followed in turn by still additional drying prior to screen application of another color, etc., in order to prevent smearing and blending of one color into another before the ware is ultimately fired at a relatively high temperature, for example, 800°F.

To eliminate the necessity for a drying operation after each screen printing, particularly in multi-color applications, the hot melt or thermofluid ink has been developed. Such an ink comprises a thermoplastic vehicle which is solid at the temperature of the ware to be printed (normally room temperature) but which becomes fluid and therefore flowable when heated to a higher temperature. In the fluid condition, the thermofluid ink is forced through a screen in the usual manner onto a surface to be printed where it solidifies almost instantly because of the relatively lower temperature of that surface. Prior to this time the ink may be maintained in a fluid condition either by radiant heat or by passing an electric current through the wires of the screen.

It is not a simple matter to devise a thermoplastic medium for use as hot-melt or thermo-fluid ink in screen printing. In order to function properly, such a thermofluid ink must have certain rather precise physical properties. It has been noted, for example, that a thermo-fluid ink must melt quickly within a narrow temperature range without substantial physical or chemical change; must not run after application to a surface; and yet must level properly before solidifying. If the thermo-fluid ink has insufficient fluidity, tiny pinholes result in the design left by the screening operation. The pinholes later enlarge during a firing operation and permanently detract from the appearance of the printed design. Pinholes also tend to promote bleeding of subsequently screened colors into other colors during the time required for the subsequently screened colors to solidify.

Still other requirements for a satisfactory thermo-fluid ink include good adherence to a glass, ceramic or metal surface; avoidance of gellation when in a molten condition; stability over prolonged periods of time; moisture-resistance; susceptibility to firing without leaving objectionable carbon deposits; and, when printed on vitreous surfaces, the ability to pass a standard hot alkali test.

In view of these essential and sometimes diverse specifications, difficulty has been met in producing thermo-fluid inks that meet all these requirements and that are uniformly suitable for various screen applications. Previously, the art has found it necessary to compound a thermo-fluid ink from a fairly large member of components in order that the ink have as many as possible of the listed desired physical properties. One or more natural waxes in combination with one or more natural resins in combination with still other ingredients have been suggested. For example, a thermo-fluid vehicle is disclosed in U.S. Pat. No. 2,807,555 comprising in admixture the reaction product of stearic acid and an aliphatic mono-amine, a natural vegetable wax, and polyethylene glycol. U.S. Pat. No. 2,842,454 discloses a thermo-fluid vehicle comprising paraffin, natural vegetable wax, aluminum stearic acid or stearyl alcohol. Similarly, U.S. Pat. No. 2,748,093 discloses a thermo-fluid vehicle comprising diphenyl hydrogenated rosin, an ethylene glycol ester of hydrogenated rosin; a diethylene glycol ester; and polybutene.

In addition, the use of known hot melt inks or thermo-fluid vehicles has not always achieved entirely satisfactory results in multi-color screen printing because of damage to previous prints from the heat of succeeding screen applications. For example, screen markings from one screen application can appear on the print of a preceding screen application. Or alternatively, a succeeding screen application can pick-off or lift-off part of the print of a previous screen application.

Moreover, the increasing use of disposable, non-returnable containers has introduced a further cost consideration. In addition to the foregoing requirements, an ink used for screen printing, either for single or multicolor printing, must also be relatively inexpensive for application to containers designed to be thrown away after a single use.

SUMMARY OF THE INVENTION

The present invention provides a novel thermo-fluid ink especially adapted for application by a screen process to ceramic, metal and plastic ware. Although of simple formulation and consisting mainly of a single polyamide resin, the present thermo-fluid ink satisfies all the requirements previously mentioned for this type of hot melt, screen application onto a receiving surface.

The thermo-fluid ink of the invention comprises a solid thermoplastic polyamide resin formed by interreacting a dicarboxylic acid, such as dimerized fatty acid, and a linear diamine such as hexylmethyldiamine. For use as a screen ink, the solid polyamide resin must have a molecular weight or be plasticized with a sufficient amount of a compatible plasticizer to have a melting point within the range of about 85°C to about 120°C. The ink also includes a sufficient amount of a pigment to impart color or opacity.

In a preferred practice of the invention, when the present inks are used to print a ceramic surface such as glass, the ink includes a substituted organosilane having at least one oxy substituent selected from the class consisting of an alkoxy group up to four carbon atoms and an aryloxy group up to 10 carbon atoms, and at least one organic group compatible with the polyamide resin. The silane couples the ink to the ceramic surface by chemically reacting with it and thereby serves to provide a stronger bond between the resin of the ink and the ceramic surface than would otherwise be the case.

The polyamide resin of the present invention is also adapted for multicolor applications. In this form of the invention, a first screen application is made of the polyamide ink as a thermo-fluid hot melt as just described; and a second screen application follows in which the polyamide resin is applied from alcoholic solution in an air-dry application. The alcohol used should have a boiling point within the range of about 110°C to about 175°C. This successive screen application of a hot melt type of thermo-fluid ink followed by a screen application from an alcoholic medium has been found to avoid the problems of leaving screen markings or pick-off and of causing a melting or blurring of previously applied prints.

DESCRIPTION OF THE PREFERRED EMBODIMENTS

Referring initially to the components of the present inks, they comprise in simplest form a polyamide resin, desirably plasticized, a pigment, and preferably a substituted organosilane when a ceramic surface is to be printed. The polyamide resin is formed by interreacting one or more dicarboxylic acids and one or more linear diamines. The dicarboxylic acid contains from about 6 to 21 carbon atoms in which the chain connecting the two carboxylic groups is hydrocarbon. This chain may be substituted or not, as long as the substituents do not adversely affect the properties of the ink or the surface of the ware to be printed. Preferably, the connecting chain is divalent alkylene. Divalent alkylene chains approaching the upper limit of the number of carbon atoms indicated, for example, stearylene, $C_{17}H_{34}=$, are preferred, since these better impart the physical properties desired in the polyamide resin of the present inks. The preferred dicarboxylic acids include dimerized fatty acids, preferably having an organic hydrocarbon chain of about 16 to about 20 carbon atoms. Polyamide resins prepared from such acids and preferred in the practice of the invention are sold by Emery Industries, one under the trademark "Emery" and by General Mills under the trademark "Versamid".

The diamines employed contain from about 2 to about 8 carbon atoms in which the chain connecting the two amine groups is hydrocarbon. The chain may be substituted or not, as long as the substituents do not adversely affect the properties of the ink or the surface to be printed. Preferably the connecting chain is divalent alkylene, for example, ethylene diamine through hexamethylene diamine. The manner and conditions for preparing polyamide resins from dicarboxylic acids and linear diamines are well known in the art and do not form a part of the present invention.

Likewise, the pigments used do not form a critical part of the invention and are present merely to impart color or opacity. Accordingly, any pigment known in the art may be used, depending on the color or degree of opacity sought. Examples of solid pigments that may be used as fine particles include carbon black, iron oxide, lead, chrome, molybdate orange, titania, and the like.

As indicated, the polyamide resin should have a molecular weight providing a melting point within the range of about 85°C to about 120°C or adapted to be plasticized so as to have a melting point within that range. The role of a plasticizer is mainly to impart flexibility, to reduce brittleness of the polyamide resin, and to reduce its melting point where that is necessary or advisable. As a rule, any amide or amine-containing plasticizer that is liquid at room temperatures, compatible with the polyamide resin, and that has no adverse effect on the ware to be printed is useful. For example, 2-hydroxypropylethylene-diamine can be employed. However, the preferred plasticizers are arylamides or substituted arylamides, such as N-ethyl-o-toluenesulfonamide, N-ethyl-p-toluenesulfonamide, and mixtures thereof. These compounds are sold by Monsanto under the trademark "Santicizer 8".

The silanes useful in the present inks are those having the general formula: $(R_1)_m (R_2)_n Si H 4-(m+n)$ in which $R_1$ is alkoxy up to four carbon atoms or aryloxy up to ten carbon atoms, $R_2$ is an organic substituent compatible with the polyamide resin, and each of $m$ and $n$ is a whole number and can be 1, 2, or 3.

More particularly, $R_1$ may be methoxy, ethoxy, propoxy, butoxy, phenoxy, tolyloxy, xyloxy, etc. $R_2$ as an organic substituent compatible with the polyamide resin may be an aliphatic radical and an cycloaliphatic (alicyclic) radical up to about eight carbon atoms, and an aromatic radical up to about 12 carbon atoms. $R_2$ can be saturated or unsaturated, including diolefinic unsaturation. As specific examples, $R_2$ can be vinyl, propenyl, isopropenyl, acrylic, methacrylic, ethylacrylic, butenyl, isobutenyl, vinylene, benzene, propylene benzene, butylene benzene, vinylene toluene, methyl, ethyl, propyl, isopropyl, butyl, isobutyl, phenyl, benzyl, toluyl, xylyl, etc. Representative desirable silanes are gamma-methacryloxypropyltrimethoxysilane; 3,4-epoxycyclohexylethyltrimethoxysilane; and gamma-glycidoxypropytrimethoxysilane, with the last mentioned silane being preferred.

While the present invention is not to be limited by theory, it is postulated that the incorporation of a silane in the present inks provides additional advantages in adhering the inks to a ceramic surface, because the alkoxy or aryloxy group hydrolyses and reacts with chemical groups on the ceramic surface, probably hydroxyl groups. Simultaneously, the compatible organic group or groups on each silane molecule are oriented into the polyamide itself. In this manner, the silane couples the polyamide resin to the ceramic surface. The silane also improves resistance of the ceramic surface to attack from alkali as hereinafter more fully described.

While the present thermo-fluid or hot melt inks comprise basically the components just described, it is understood that still other components may be added in amounts as needed to modify the physical characteristics of the inks, such as flow properties, print definition, etc., or reduce their cost. For example, fine asbestos fibers may be added as a thixatrope, or particulate calcium carbonate may be included as a filler, or colloidal silica may be incorporated as both a thixatrope and a filler.

When undertaking successive screen applications with the polyamide resin, it has been found that screen marks, pick-offs, and the like are avoided if the first application is as a thermo-fluid ink and the second application is from alcoholic solution. The same previously described polyamide resins are used for each application, although as part of an alcoholic medium the polyamide resin can have a somewhat higher molecular weight to provide a melting point within the range of about 85°C to about 140°C or adapted to be plasticized to have a melting point in that range. In like manner, the boiling point of the alcohol used for a screen application is quite important. If the alcohol has too low a boiling point, it evaporates too quickly and the ink components dry on the screen, blocking its open network and preventing color transfer. If, on the otherhand, the alcohol has too high a boiling point, it evaporates slowly, requires a longer drying period, and the ink components normally have significantly reduced solubility in the alcohol.

As a general rule, the alcohol should have a boiling point within the range of about 110°C to about 175°C. Useful alcohols include n-butyl alcohol, hexanol, cyclohexanol, 1-butanol-2-ethyl,1-butanol-2-methyl, 1-butanol-3-methyl (isoamyl alcohol), and the like. Cyclohexanol is preferred. While the alcohol is considered the active and necessary solvent for a liquid screen application, it is possible to dilute the alcohol up to about a 1:2 weight ratio of alcohol to a hydrocarbon solvent as diluent. Such hydro-carbon solvents may be either aliphatic or aromatic solvents like naphtha, toluene, benzene, xylene, etc.

Proportions are not critical to the present invention and may be varied to meet diverse requirements. In general, a thermo-fluid ink may generally comprise in parts by weight about:

| Polyamide resin | 60 to 80 |
|---|---|
| Plasticizer | 0.5 to 10.0 |
| Pigment | 1 to 30 |

When it is desired to include a silane as defined, about 0.2 to 1.5 parts by weight of the silane can be added to the indicated formulation. If an alcohol is to be used for a liquid, air-dry screen application, only enough alcohol, alone or diluted with an aliphatic or aromatic solvent, need be added to effect complete dissolution of the dissolvable components of the ink. If too much alcohol is added, an undesired gel results. In general, with reference to the indicated formulation, about 25 to 45 parts by weight of the alcohol are used.

In preparing a thermo-fluid ink of the invention, the polyamide resin is completely melted after which the plasticizer and silane, if one is used, are added and the components mixed well by a high speed mixer. The pigment particles are next added and mixed into the admixture until the particles are completely wet. The mixture is then thoroughly dispersed by a colloid mill or water heated three-roll mill and collected in pans. After cooking and solidifying, the solid material is broken into chunks which are ready for use.

To prepare a liquid ink for an air-dry screen application, the polyamide resin is slowly dissolved in the solvent or solvents without appreciably heating the mixture or mixing in air bubbles. The remaining materials to be used are then added in any order, for example, the stabilizer, fillers or thixtropoes, and a silane if one is used. The mixture is then thoroughly mixed and dispersed on a water cooled, three-roll mill.

The actual application of the present inks is conventionally carried out by squeegeeing the ink through a screen of fine stainless steel wires onto a surface. In the case of a thermo-fluid ink, the screen may be electrically heated or the ink maintained fluid by radiant burners. Various surfaces of ceramic, metal, or plastic may be printed by the present process. Usually, the ware processed is in the form of bottles or tumblers. The present inks are particularly adapted for screen printing plastic disposable, throw-away bottles, such as bottles of polyethylene, polypropylene, polyvinyl chloride, and the like. The prints or decorations require no cure in the conventional sense but can be slightly heated to improve adhesion to the printed surface and-/or lingering solvents can be removed as by playing a flame over the print for a few seconds.

The following examples are intended to illustrate the invention and should not be construed as imposing limitations on the claims.

EXAMPLE 1

One satisfactory thermo-fluid ink of the present invention had this formulation in weight percent:

|  | Percent |
|---|---|
| Emerez 1538 | 45.5 |
| N-ethyl-o-and-p-toluene-sulfonamide | 4.9 |
| Gamma-glycidoxypropyltrimethoxysilane | 1.2 |
| Carbon black | 48.4 |
| Total | 100.0 |

Emerez 1538 is a polyamide resin manufactured by Emery Industries, Inc. It is formed by interreacting a dimerized fatty acid with a linear diamine and has a melting point within the range of about 85°C to about 120°C. Additional properties of this resin and of still other polyamide resins useful in the present invention are given in Examples 8 through 11. The ortho and para sulfonamides are present as a mixture.

After melting the polyamide resin of this formulation and admixing the melt with the other indicated components, the resulting ink was conventionally screened onto a polyethylene bottle. The ink solidified instantly on the relatively cold surface. Although not essential, a polishing step of about two to six seconds duration was carried out by impinging a flame across the print or decoration to improve its gloss and adhesion to the bottle. Instead of flame impingement, high velocity hot air or radiant heat could have been used. The polishing step was performed directly at the screening machine and entirely eliminated the need for cumbersom ovens or lehrs. The print required no baking or curing cycle to achieve the desired properties sought, and the decorated bottle could be packed or used immediately.

This ink withstood bottle-washing cycles, pasturizing cycles, (as when printed on milk bottles), rough handling, and the like. These attributes previously were possible only with screening inks requiring a lengthy oven bake or cure. For example, bottles printed with this ink passed the following hot alkali test. A 5 percent sodium hydroxide solution was heated to and maintained at 160°F in a constant temperature bath. A bottle having a print from the ink of this example was immersed for 15 minutes in the sodium hydroxide solution at this temperature. The bottle was then removed and rinsed with hot tap water. After cooling, the print was tested for adhesion with the sticky side of pressure sensitive tape laid thereacross. Upon pulling away the tape, it carried with it none of the print.

EXAMPLES 2 AND 3

Two additional thermo-fluid inks of the present invention having, respectively, white and red colors, comprised the following formulations:

| | Parts by Weight | |
|---|---|---|
| Materials | Example 2-White | Example 3-Red |
| Emerez 1538 | 73.3 | 73.3 |
| N-ethyl-o and p-toluenesulfonamide | 1.5 | 2.0 |
| Gamma-glycidoxypropyltrimethoxy-silane | 0.6 | 0.6 |
| Titania | 24.6 | — |
| Molybdate Orange | — | 20.0 |
| Barium, calcium, magnesium salts of diazotized naphthalene mono-carboxylic acid | — | 4.1 |
| | 100.0 | 100.0 |

The inks of these examples have the following properties:

| Property | Example 2 - White | Example 3 - Red |
|---|---|---|
| Density (lbs./gal.) | 9.75 | 9.70 |
| Melting point °C | 85°C–88°C | 85°–88°C |
| Resin solids - weight percent | 73.3 | 73.3 |
| Pigment solids - weight percent | 24.6 | 24.1 |

EXAMPLE 4

A liquid ink of the present invention adapted for air-dry screen application had this basic formulation in weight percent:

| | Percent |
|---|---|
| Emerez 1540 | 49 |
| Cyclohexanol | 35 |
| Xylene | 13 |
| N-ethyl-o-and-p-toluenesulfonamide | 2 |
| Gamma-glycidoxypropyltrimethoxysilane | 1 |
| Total: | 100 |

Emerez 1540 is a polyamide resin manufactured by Emery Industries, Inc. It is formed by interreacting a dimerized fatty acid with a linear diamine and has a melting point within the range of about 85°C to about 120°C. Additional properties of this resin and of still other polyamide resins useful in the present invention are given in Examples 8 through 11.

In preparing this ink, the cyclohexanol and xylene were placed in a mixing tank. With a stirrer operating, the polyamide resin was slowly added. When it was completely dissolved, the silane and toluenesulfonamide ingredients were added. The mixing was carried out at the slowest possible speed. A suitable pigment, such as carbon black, was then dispersed in this formulation in equal parts by weight by pigment and alcoholic solution, after which the ink was ready for use. This liquid ink was used on a bottle after a print was previously made with the thermo-fluid ink of Example 2 to produce a multicolored print. The print was capable of being dried in about 2 to 6 seconds by a direct flame impingement. Alternatively, a high velocity hot air or radiant heaters could have been used. The finished printed decoration exhibited a quality and durability that was previously possible only with inks requiring a lengthy stoving or baking operation.

EXAMPLE 5

A further liquid ink particularly adapted for use after a thermo-fluid ink for multi-color printing and based on the formulation of Example 4, without the carbon black, was prepared in weight percent as follows:

| | Percent |
|---|---|
| Example 4 formulation | 74.55 |
| Colloidal silica | 16.36 |
| Molybdate orange | 8.18 |
| Barium, calcium, and magnesium salts of diazotized naphthalene mono-carboxylic acid | 0.91 |
| Total: | 100.00 |

EXAMPLES 6 AND 7

Two additonal liquid fluid inks of the present invention for air-drying, screen application having, respectively, white and red colors, comprised the following formulations:

| | Parts by Weight | |
|---|---|---|
| Materials | Example 6 - White | Example 7 - Red |
| Cyclohexanol | 26.4 | 20.0 |
| Xylene | 12.0 | 10.5 |
| Emerez 1540 | 29.6 | 26.0 |
| Gamma-glycidoxypropyltrimethoxy-silane | 0.6 | 0.3 |
| Fine asbestos fibers | 2.0 | 2.0 |
| Particulate calcium carbonate | 14.4 | 30.3 |
| Titania | 15.0 | — |
| Molybdate orange | — | 9.2 |
| Barium, calcium, magnesium salts of diazotized naphthalene mono-carboxylic acid | — | 1.7 |
| Total: | 100.0 | 100.0 |

The inks of these examples had the following properties:

| | Example 6 - White | Example 7 - Red |
|---|---|---|
| Density (lbs./gal.) | 10.0 | 10.5 |
| Viscosity cps 77°F No. 6 spindle (Brookfield) | | |
| 2.5 rpm | 88,000 | 128,000 |
| 20 rpm | 33,000 | 34,000 |
| Thix No. | 2.7 | 3.8 |
| Grind (Minimum Hegman units) | 3.5 | 3.5 |
| Resin solids - weight percent | 29.6 | 29.6 |
| Pigment solids - weight percent | 34.4 | 34.4 |

The term "Thix No." is a ratio of the viscosities at 2.5 rpm and 20 rpm, respectively, and compares the thixotrophy of the inks, for example, by indicating the relative tendencies of the inks to drip through screen openings when a printing machine is not in operation. The grind value indicates the presence or absence of an undesirable number of course particles or agglomerates in a dispersion. The higher the number, the smaller the particles and the better the grind is said to be.

EXAMPLES 8 to 11

The physical properties of the polyamide resin of Example 1 (Emerez 1538) and Example 4 (Emerez 1540), as well as of four additional polyamide resins prepared in a like manner and useful in the present invention, are given by the following Table A.

The inks of the present invention can be screened onto ware of the type described, the prints heat or flame treated, cooled, and the printed ware packed in seconds. The decoration obtained is a rough, flexible, high gloss, chemical resistant print capable of passing the standard hot alkali resistance test. A baking cycle which in other processes may require 10 to 20 minutes or longer is entirely eliminated. In fact, the present inks are so fast-setting that bottles may be printed or decorated at the rate of over 120 a minute by one screen machine.

While the present inks have been described in connection with screen applications for which they are particularly adapted, it is possible to apply the inks by other techniques, such as by dipping, spraying, roller coating, and the like.

Although the foregoing described several preferred embodiments of the present invention, it is understood that the invention may be practiced in still other forms within the scope of the following claims:

TABLE A

| Example | 1 | 2 | 8 | 9 | 10 | 11 | Test Method |
|---|---|---|---|---|---|---|---|
| SPECIFICATIONS | | | | | | | |
| Softening Point, °C | 95–105 | 105–115 | 105–115 | 95–105 | 98–102 | 105–115 | ASTM E28–58T |
| Kinematic Vixcosity, poise, 160°C | 6.5–8.5 | 12–18 | 21–27 | 3.0–4.5 | 26–34 | 28–33 | ASTM D445–64 |
| Molten Color, Gardner 1963 (max.) | 12 | 12 | 12 | 12 | 12 | 12 | ASTM D1544–63T |
| TYPICAL PROPERTIES | | | | | | | |
| Amine Value, mg. KOH/gm. | 2.3 | 1.3 | 1.5 | 5.2 | 5.0 | 1.5 | ASTM D2074–62T |
| Acid Value, mg. KOH/gm. | 2.1 | 1.9 | 2.9 | 5.0 | 2.5 | 3.1 | ASTM D1980–61 |
| Density, lbs./gal., 25°C (Void-free basis) | 8.2 | 8.2 | 8.2 | 8.2 | 8.3 | 8.2 | — |

1. A normally solid, thermo-fluid, fast-set ink free of liquid vehicle adapted for direct application by a screen process to ceramic, metal and plastic ware and for substantially instant solidification after application, said ink consisting essentially of: 60 to 80 parts by weight of a solid, thermoplastic polyamide resin consisting essentially of the reaction product of a dicarboxylic acid and a linear diamine, and 0.5 to 10.0 parts of a compatible liquid plasticizer for the resin consisting essentially of an aryl sulfonamide, said polyamide resin with said plasticizer having a melting point within the range of about 85°C to about 120°C, and a sufficient amount of a pigment to impart color to said ink.

2. The fast-set ink of claim 1 in which said ware is ceramic, and said ink includes a sufficient amount of a substituted organosilane to couple the applied ink to said ceramic ware, said silane having at least one oxy substituent selected from the class consisting of an alkoxy group up to four carbon atoms and an aryloxy group up to 10 carbon atoms, and at least one organic group compatible with said polyamide resin.

3. The fast-set ink of claim 2 in which said silane is gamma-glycidoxypropyltrimethoxysilane.

4. The fast-set ink of claim 1 in which said plasticizer is selected from the group consisting of N-ethyl-o-toluenesulfonamide, N-ethyl-p-toluenesulfonamide, and mixtures thereof.

5. The fast-set ink of claim 1 in which said pigment is present in about 1 to about 30 parts by weight.

6. The fast-set ink of claim 5 including about 0.2 to 1.5 parts by weight of a substituted organosilane having at least one oxy substituent selected from the class consisting of an alkoxy group up to four carbon atoms and an aryloxy group up to 10 carbon atoms, and at least one organic group compatible with said polyamide resin.

7. A process for inking a surface comprising: applying to said surface a thermo-fluid, fast-set ink consisting essentially in combination of: 60 to 80 parts by weight of a normally solid thermoplastic polyamide resin consisting essentially of the reaction product of a dicarboxylic acid and a linear diamine, and 0.5 to 10 parts of a compatible liquid plasticizer for the resin consisting essentially of an aryl sulfonamide, said polyamide resin with said plasticizer having a melting point within the range of about 85°C to about 120°C, and a sufficient amount of a pigment to impart color to said ink, and cooling the ink.

8. The process of claim 7 in which said surface is ceramic, and said ink includes a substituted organosilane having at least one oxy substituent selected from the class consisting of an alkoxy group up to four carbon atoms and an aryloxy group up to 10 carbon atoms, and at least one organic group compatible with said polyamide resin, and reacting the oxy substituent of the silane with said ceramic surface.

9. The process of claim 7 in which said pigment is present in about 1 to about 30 parts by weight.

10. The process of claim 9 in which said ink includes about 0.2 to 1.5 parts by weight of a substituted organosilane having at least one oxy substituent selected from the class consisting of an alkoxy group up to four carbon atoms and an aryloxy group up to 10 carbon atoms, and at least one organic group compatible with said polyamide resin.

* * * * *